UNITED STATES PATENT OFFICE.

LUCAS PETRON KYRIAKIDES AND RICHARD BLAIR EARLE, OF BOSTON, MASSACHUSETTS, ASSIGNORS TO HOOD RUBBER COMPANY, OF BOSTON, MASSACHUSETTS, A CORPORATION OF MASSACHUSETTS.

PROCESS OF PRODUCING ISOPRENE.

1,033,180. Specification of Letters Patent. Patented July 23, 1912.

No Drawing. Application filed November 11, 1911. Serial No. 659,827.

*To all whom it may concern:*

Be it known that we, LUCAS P. KYRIAKIDES and RICHARD B. EARLE, citizens of the United States, residing at Boston, Massachusetts, have invented certain new and useful Improvements in Processes for Producing Isoprene, of which the following is a specification.

Our invention relates to a new and valuable process for producing isoprene (2 methylbutadiene 1, 3; B methyldivinyl) which is a valuable hydrocarbon used in the preparation of rubber or terpenes.

The new process consists in passing the vapors of valeraldehyde of the formula:

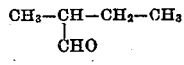

over dehydrating catalytics such as aluminum silicate heated to temperatures from 400°–600° C., at pressures less than 60 millimeters of mercury.

In order to illustrate the new process more fully the following example is given: Valeraldehyde of the formula:

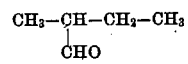

is distilled slowly over aluminum silicate, either powdered or in briquet form, which is kept at a temperature of 550° C. and a pressure of one millimeter of mercury by a vacuum pump. The products of the reaction are condensed in suitable receivers by means of refrigerating agents and purified by fractional distillation. Any unchanged aldehyde is passed again over the catalytic as before.

The fraction boiling from 32°–37° C. consists of nearly pure isoprene and may be used in this state of purity.

The formation of isoprene takes place by the splitting off of water, according to the equation:

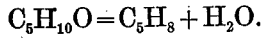

The process is useful at the ordinary pressure but the yield is much increased by carrying out *in vacuo*.

The yield of isoprene is about 70% of the theory and contains as an impurity about 1/7 as much trimethylethylene.

We claim:

1. The process for producing isoprene, which consists in passing the vapors of the valeraldehyde of the formula:

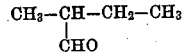

over dehydrating catalytics at temperatures from 400° to 600° C., *in vacuo*, at pressures less than 60 millimeters of mercury.

2. The process for producing isoprene which consists in passing the vapors of the valeraldehyhe of the formula:

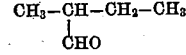

over aluminum silicate at temperatures from 400° to 600° C., *in vacuo*, at pressures less than 60 millimeters of mercury.

In testimony whereof, we affix our signatures in presence of two witnesses.

LUCAS PETRON KYRIAKIDES.
RICHARD BLAIR EARLE.

Witnesses:
JESSIE R. MOTT,
M. ALICE HAGARTY.